June 5, 1962 D. C. SCHULTZ 3,037,318
RELEASABLE FLOAT
Filed June 11, 1959

INVENTOR.
BY David C. Schultz

United States Patent Office 3,037,318
Patented June 5, 1962

3,037,318
RELEASABLE FLOAT
David C. Schultz, 89 Caledonia Road, Asheville, N.C.
Filed June 11, 1959, Ser. No. 819,666
2 Claims. (Cl. 43—44.87)

This invention relates to a fishing float which is not only adjustable along the length of a fishing line but which can be locked at any point and automatically released from the fishing line and which may be used as a slip type float.

The present invention consists of a hollow or solid buoyant body having a bore extending therethrough of one diameter or two diameters through which a fishing line can be passed and another body be attached thereto.

It is the object of the invention to provide a quick attaching type fishing float which may be conveniently adjusted along the length of the fishing line or which may be selectively used as a slip float.

Another object of the present invention is to provide an improved form of fishing float which is made of sturdy components capable of withstanding rugged use and which will be completely efficient for the purpose to which the fishing float is applied.

Another object of the present invention is to provide a fishing float having a line clamping arrangement.

Many other features, advantages and additional objects of the present invention will become manifest to those versed in the art upon making reference to the detailed description which follows and the accompanying drawing in which a preferred structural embodiment incorporating the principles of the present invention is shown by way of illustrative example only.

A further object is to provide a stationary type float structure which converts to a slip type float structure upon a downward pull of the line.

Although various minor modifications of the present invention may be suggested by those versed in the art, it should be understood that I wish to embody within the scope of this patent warranted hereon all such modification as reasonably and properly within the scope of my contribution to the art.

Figures 1, 2:
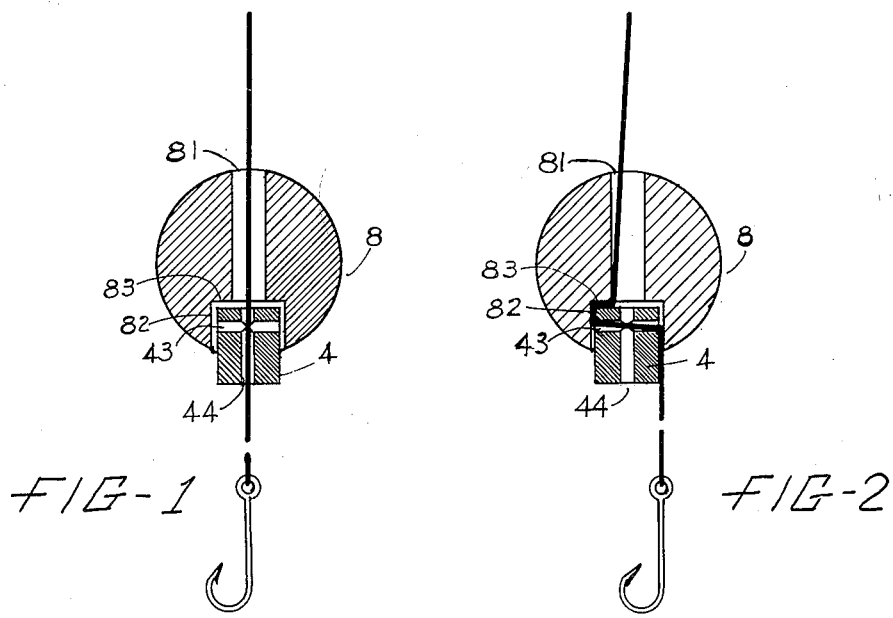
FIGURE 1 is a side elevation view of a fishing float showing one form of the present invention as a slip type float.
FIGURE 2 is a side elevation view of a fishing float showing one form of the invention as a stationary type float.
Figure 3:
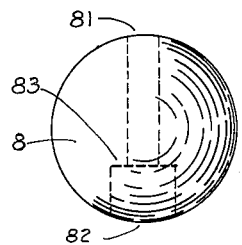
FIGURE 3 is a side elevation view of a buoyant body showing a hole or holes diametrically in line therein of the present invention.
Figure 4:
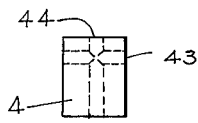
FIGURE 4 is a side elevation view of a buoyant body with a vertical hole and a horizontal hole therein of the present invention.

Referring to the drawing, reference characters are used for each of the separate bodies and holes therein forming with the fishing line a fishing float for the present invention.

Character 8 is a buoyant body, character 81 is a narrow bore formed in the upper end of the body 8 and character 82 is a short counterbore at the lower end of the body 8 and being coaxial with and communicating with bore 81 and defining a shoulder 83, therebetween.

Character 4 is a second buoyant body adapted to fit snugly solely in the second bore 82 and adjacent to shoulder 83 and character 43 is a horizontal aperture therethrough. Character 44 is a vertical aperture through the body 4.

Thus when the body 4 with the fishing line through the aperture 43, as illustrated by FIGURE 2, and the fishing line looped against the periphery of the body 4, is forced into the conterbore 82 of the body 8 it will be locked rigidly to the body and will clamp the fishing line against the inside surface of the counterbore 82 and thus form a stationary fishing float.

It is to be noted in FIGURE 2, that upon a downward pull on the line as by a fish, the bodies 4 and 8 will separate and allow the said bodies to freely slide on the line and form a slip type float allowing the object to be brought adjacent to the end of the pole or other attachment.

Also observe by using the two buoyant bodies 8 and 4 of the present invention illustrated by FIGURE 1, that the fishing line from a pole can be passed through bore 81, then through the counterbore 82 of the body 8 and at the same time through the aperature 44 of the body 4 and then to the hook end of the line to form a slip type fishing float.

While in describing the invention I have referred in detail to the form, arrangement and construction of the parts involved, the same is to be considered only to be limited thereto except as may be specifically set forth in the appended claims.

I claim:

1. A releasable fishing float for use on a fishing line comprising; a buoyant body having a first relative narrow bore therethrough at the upper end thereof and a second large relatively short counter bore at the lower end thereof, coaxial with and communicating with said first bore and defining a shoulder therebetween, a second body of such form as to snugly fit solely in said second bore and adjacent said shoulder, said second body being provided with an aperture therethrough arranged wholly perpendicular to said bores and within said second bore when the second body is in assembled relationship with said first body, and the fishing line being threadable through said first and second bores and said aperture, whereby when said second body with said line in said aperture is inserted in said second bore the line will be held against movement, but upon a downward pull on the line, the two bodies will separate and allow the bodies to freely slide on said line.

2. A fishing float as set forth in claim 1, wherein said second body is also provided with a second aperture coaxial with said bores when said first and second bodies are in assembled position to thereby alternatively provide a slip type fishing float when said fishing line is threaded through said bores and said second aperture.

References Cited in the file of this patent
UNITED STATES PATENTS

| | | |
|---|---|---|
| 958,581 | Blank | May 17, 1910 |
| 1,468,720 | Low | Sept. 25, 1923 |
| 1,547,746 | Gore | July 28, 1925 |
| 2,214,961 | Hawley | Sept. 17, 1940 |
| 2,302,549 | Hodges | Nov. 17, 1942 |
| 2,316,074 | Kimbrough | Apr. 6, 1943 |
| 2,591,332 | Behensky | Apr. 1, 1952 |